US012796581B2

(12) United States Patent
Yeomans

(10) Patent No.: US 12,796,581 B2
(45) Date of Patent: Nov. 17, 2026

(54) EARTH WORKING TOOL ASSEMBLY

(71) Applicant: Digga Australia Pty. Ltd., Yatala (AU)

(72) Inventor: Allan James Yeomans, Arundel (AU)

(73) Assignee: Digga Australia Pty. Ltd., Yatala (AU)

( * ) Notice: Subject to any disclaimer, the term of this patent is extended or adjusted under 35 U.S.C. 154(b) by 456 days.

(21) Appl. No.: 18/388,053

(22) Filed: Nov. 8, 2023

(65) Prior Publication Data

US 2024/0155961 A1 May 16, 2024

(30) Foreign Application Priority Data

Nov. 10, 2022 (AU) ................................ 2022903369

(51) Int. Cl.
*A01B 35/22* (2006.01)

(52) U.S. Cl.
CPC .................................. *A01B 35/225* (2013.01)

(58) Field of Classification Search
CPC ..... A01B 35/225; A01B 15/025; A01B 13/08; E02F 9/2875; E02F 9/2833; E02F 9/2825
See application file for complete search history.

(56) References Cited

U.S. PATENT DOCUMENTS 3,006,089 A * 10/1961 Johnson ................ E02F 9/2875 172/753
3,371,723 A * 3/1968 Appl .................... A01B 35/225 172/708
5,165,487 A * 11/1992 Williams ............. A01B 15/025 172/699
6,240,663 B1 * 6/2001 Robinson .............. E02F 9/2841 37/458
6,401,834 B1 * 6/2002 Yeomans ............. A01B 15/025 172/701.3
8,205,362 B2 * 6/2012 Yeomans .............. E02F 9/2833 37/453
2018/0044895 A1 * 2/2018 Rol Corredor ....... E02F 9/2841

* cited by examiner

*Primary Examiner* — Jamie L McGowan
(74) *Attorney, Agent, or Firm* — Weston R. Gould; DINSMORE & SHOHL LLP

(57) ABSTRACT

Provided is an earth working tool assembly comprising: a tool shank having a leading end portion; an earth working tip having a trailing end portion that is detachably engageable with the leading end portion of the tool shank; and a fastening assembly for detachably fastening the earth working tip to the tool shank. The fastening assembly comprises: a trailing connector that is connectable to the tool shank; a leading connector that is connectable to the earth working tip; a spring mounting mechanism interposed between the trailing and leading connectors. The spring mounting mechanism is configured so that the trailing and leading connectors can be driven away from each other against a bias of the spring mounting mechanism, into and out of an operative condition in which the spring mounting mechanism acts to retain the earth working tip and the tool shank in engagement with each other.

16 Claims, 8 Drawing Sheets

EARTH WORKING TOOL ASSEMBLY

CROSS REFERENCE TO RELATED APPLICATIONS

This application depends from and claims priority to Australian Patent Application No: 2022903369 filed Nov. 10, 2022, the entire contents of which are incorporated herein by reference.

FIELD

This disclosure relates to tools for earth working.

BACKGROUND

Australian Patent 200047160B2 ("AU160") describes an earth working tool assembly and is incorporated herein by reference, in its entirety.

AU160 describes an earth working tool assembly of the type including a tool shank terminating in a foot and an earth working tip or point which has a socket for engagement by the shank foot. A bridging member extends between the shank foot and the tip, the bridging member having a tongue at one end which is received in a channel on the underside of the shank foot and a channel at the other end which receives a rib on the underside of the tip. The bridging member transfers a proportion of side loading on the tip to the tool shank at a position rearwardly from the leading end of the foot of the tool shank so that the shank has increased resistance to breakage or bending. The bridging member is connected to the channel with a bolt and nut, a shank of the bolt passing through an end wall of the channel and threaded into a nut arranged on the bridging member. The bridging member is keyed to the earth working tip or point.

AU160 does not describe an arrangement that facilitates quick release of the earth working tip or point. Quick and simple release is advantageous in the field. In use, the bridging member of AU160 is underneath the tool shank and the earth working point. This makes it difficult and inconvenient to access, for example for changing the earth working tip, which requires that the bridging member be unbolted from the tool shank. This process can be difficult and time-consuming, particularly in the field, where soil and other detritus may be clinging to the bridging member and associated components. For example, the operator or user is required to have sight of the bolt and nut so as to properly engage a tool. This would require that person to work in an awkward position.

SUMMARY

According to a first aspect of the invention, there is provided an earth working tool assembly that comprises:

- a tool shank having a leading end portion;
- an earth working tip having a trailing end portion that is detachably engageable with the leading end portion of the tool shank; and
- a fastening assembly for detachably fastening the earth working tip to the tool shank, the fastening assembly comprising:
  - a trailing connector that is connectable to the tool shank;
  - a leading connector that is connectable to the earth working tip;
  - a spring mounting mechanism interposed between the trailing and leading connectors, the spring mounting mechanism being configured so that the trailing and leading connectors can be driven away from each other against a bias of the spring mounting mechanism, into and out of an operative condition in which the spring mounting mechanism acts to retain the earth working tip and the tool shank in engagement with each other.

The leading connector may include a catch body with a leading side and a trailing side. At least one catch formation may be arranged on the catch body and releasably engageable with at least one complementary catch formation on the earth working tip. The catch formations may be configured so that displacement of the leading connector in a leading direction against the bias of the spring mounting mechanism serves to disengage the catch formations, and displacement of the leading connector, under action of the spring mounting mechanism, in a trailing direction serves to engage the catch formations. In use, the fastening assembly is positioned underneath the tool shank. Thus, when the catch formations are disengaged, the fastening assembly can move away from the tool shank under gravity. The catch formations may be configured so that the catch formation on the catch body is required to extend in a leading direction to a predetermined extent before the catch formation can be engaged with, or disengaged from, the complementary catch formation. Thus, the catch formations are configured effectively to hook or unhook with respect to each other. The catch formations may be configured so that, at the predetermined extent, the catch body can be manoeuvred to bring the catch formations into register with each other, with subsequent release of the catch body resulting in the catch formations being engaged with each other to limit movement of the catch body in the trailing direction. Thus, the bias of the spring mounting mechanism serves to retain the earth working tip in a working condition. In a reverse operation to detach the catch formations from each other, the catch body can be driven in a leading direction, against the bias of the spring mounting mechanism, relative to the tool shank. At said predetermined extent of movement, the catch body can be manoeuvred to bring the catch formations out of engagement with each other to release the catch body, allowing the earth working tip to be disengaged from the tool shank.

When the catch formations are engaged with each other, a force applied to the trailing side of the catch body can serve to extend the catch body in the leading direction to said predetermined extent to allow the disengagement of the catch formations. In that released condition, a subsequent force applied to the trailing side of the leading connector can serve to extend the catch body in the leading direction to allow the catch formations to be re-engaged. The trailing connector may be connectable to the tool shank to facilitate limited pivotal movement of the trailing connector and thus the fastening assembly with respect to the tool shank. Thus, when the catch formations are disengaged, the fastening assembly can pivot away from the tool shank to a limited degree, under gravity. The catch body may be configured so that the subsequent force that is applied to the catch body can be applied at a suitable position such that the subsequent force serves to pivot the fastening assembly back towards the tool shank to facilitate re-engagement of the catch formations. The catch body may be configured so that a position at which the force is applied to the catch body for disengaging the catch formations is interposed between said suitable position for re-engagement and the tool shank.

The catch body may have a floor wall and two opposed side walls that project from the floor wall and extend between the leading and trailing sides. The spring mounting mechanism may include a spring positioned between the side walls. The spring may be a coil spring. The spring mounting mechanism may include a leading portion of a rod that extends into the catch body and through the coil spring. A leading spring retainer may be positioned in the catch channel with the leading portion of the rod connected to the leading spring retainer at or near a leading end of the rod. The spring mounting mechanism may include a trailing spring retainer that is secured in the channel against displacement in at least a trailing direction, at or near the trailing side of the catch body, with the rod extending through the trailing spring retainer and the spring secured between the leading and trailing spring retainers.

The rod may extend through the trailing spring retainer and may be longitudinally displaceable relative to the trailing spring retainer.

The tool shank may include an anchor. The trailing connector may include a trailing portion of the rod that is secured to the anchor at least against longitudinal displacement relative to the tool shank. The anchor may have a leading side and an opposed trailing side. A passage may extend through the anchor between the leading and trailing sides. The rod may extend through the passage. A head may be arranged on a trailing end of the rod. The head may be dimensioned to bear against the trailing side of the anchor to secure the rod against linear displacement relative to the tool shank in a leading direction. The passage may be configured to permit limited, pivotal movement of the rod relative to the tool shank, and thus said limited pivotal movement of the fastening assembly relative to the tool shank.

Thus, when the rod is secured to the anchor, the catch body can be driven in the leading direction with a suitable tool to a predetermined extent to compress the spring and displace the catch formations relative to each other to facilitate engagement or disengagement of the catch formations. The catch formations can take various configurations. As set out above, the catch formations may be configured so that they hook onto each other when engaged and are unhooked when disengaged.

The catch body and the anchor are configured so that when the catch formations are engaged with each other, a gap is provided between the leading side of the anchor and the trailing side of the catch body. The rod spans the gap. In use, when the catch formations are engaged with each other, a suitable tool can be positioned in the gap to engage the trailing side of the catch body at a position between the rod and the tool shank. The tool can then be manipulated to drive the catch body, against a bias of the spring, away from the anchor. This disengages the catch formations, and the fastening assembly can pivot away from the tool shank under gravity to allow the tip to be removed from the tool shank.

Subsequently, a suitable tool can be positioned in a resulting space between the catch body and the anchor to engage the leading side of the anchor at a position between the rod and the tool shank and to engage the trailing side of the catch body on an opposite side of the rod. The tool can then be manipulated to drive the catch body, against a bias of the spring, away from the anchor. This urges the catch formations apart and pivots the fastening assembly towards the tool shank, so that, on release of the tool, the spring can serve to drive the catch formations into engagement with each other, so to secure the tip to the tool shank.

The suitable tools referred to above can be incorporated into a single tool. The tool may be in the form of a levering tool. The levering tool may have a working portion that is shaped so that it can be positioned between the catch body and the anchor in either a release orientation or an engage orientation, while accommodating the rod. The levering tool may include an elongate handle that extends from the working portion to provide levering advantage.

The working portion may include a generally flat member that is dimensioned to be received between the catch body and the anchor, and that defines a distal edge and an opposed proximal edge. The working portion may define first and second recesses that are dimensioned to accommodate the rod and open at the proximal edge. The working portion may also define first and second bearing formations in general alignment with respective recesses. The first bearing formation may be closer to the proximal edge than the second bearing formation so that, when the rod is received through the first recess, the first bearing formation can engage the catch body at a position interposed between the rod and the tool shank, and when the rod is received through the second recess, the second bearing formation can engage the catch body at a position on an opposite side of the rod. Thus, to disengage the catch formations, the working portion can be manipulated so that the rod is received through the first recess. In that position, the working portion can be tilted so that the proximal edge can bear against the anchor while the first bearing formation bears against the catch body at said position interposed between the rod and the tool shank. To engage the catch formations, the working portion can be manipulated so that the rod is received through the second recess. In that position, the working portion can be tilted so that the proximal edge can bear against the anchor while the second bearing formation bears against the catch body on an opposite side of the rod.

The trailing end portion of the earth working tip may include a lower wall and opposed side walls. The walls may define a socket in which the leading end portion of the tool shank is received when the tip is engaged with the shank. A rib that extends in a leading direction projects from an outer side of the lower wall.

The leading spring retainer may be positioned intermediate a leading end and the trailing end of the catch body, such that a catch volume is interposed between the leading spring retainer and the leading end of the catch body. The catch formation of the catch body may include opposed ridges that project into the catch volume and extend in a trailing direction from the floor wall.

The rib defines the catch formation of the earth working tip in the form of opposed recesses that correspond with respective ridges. When the catch formations are engaged with each other, as described above, the ridges are received in the recesses. Thus, to disengage the ridges from the recesses, it is necessary to displace the catch body in a leading direction to a predetermined extent to facilitate release of the catch formations from each other, as described above. To re-engage the catch formations, as described above, the catch body is displaced to said predetermined extent away from the anchor so that the ridges are aligned with the recesses. Said pivotal movement generated by this action, and described above, serves to slide the ridges into the recesses so as to secure the catch body on the tip, so securing the tip to the tool shank.

According to a second aspect of the invention, there is provided a fastening assembly for detachably fastening an earth working tip to a tool shank, the fastening assembly comprising:

a trailing connector that is connectable to a tool shank;

a leading connector that is connectable to an earth working tip;

- a spring mounting mechanism interposed between the trailing and leading connectors, the spring mounting mechanism being configured so that the trailing and leading connectors can be driven away from each other against a bias of the spring mounting mechanism, into and out of an operative condition in which, when the trailing connector is connected to the tool shank and the leading connector is connected to the earth working tip, the spring mounting mechanism acts to retain the earth working tip and the tool shank in engagement with each other.

The fastening assembly of the second aspect of the invention may be the fastening assembly of the earth working tool assembly of the first aspect of the invention.

According to a third aspect of the invention, there is provided a method of detachably fastening an earth working tip to a tool shank with a fastening assembly, the method including steps of:

- connecting a trailing connector of the fastening assembly with a tool shank;
- connecting a leading connector of the fastening assembly with an earth working tip;
- retaining the trailing connector and the leading connector in an operative condition using a spring mounting mechanism of the fastening assembly interposed between the trailing connector and the leading connector, wherein the spring mounting mechanism retains the earth working tip and the tool shank in engagement with each other.

The method of the third aspect may include a step of driving the trailing and leading connectors away from each other against a bias of the spring mounting mechanism into the operative condition.

The method of the third aspect may include a step of driving the trailing and leading connectors away from each other against a bias of the spring mounting mechanism out of the operative condition, wherein the earth working tip and the tool shank are out of engagement with each other.

The earth working tip, tool shank, and fastening assembly of the method of the third aspect of the invention may be the earth working tip, tool shank, and fastening assembly of the earth working tool assembly of the first aspect of the invention.

According to a fourth aspect of the invention there is provided a tool for, or suitable for, driving the trailing connector and the leading connector of the fastening assembly of the earth working tool assembly of the first aspect against the bias of the spring mounting mechanism of the fastening assembly.

The tool of the fourth aspect may comprise a working portion comprising first and second bearing formations for engaging the leading connector of the fastening assembly, or the catch body thereof. The first bearing formation of the tool may be for engaging the catch body of the leading connector to drive the trailing and leading connectors out of the operative condition in which the spring mounting mechanism acts to retain the earth working tip and the tool shank in engagement with each other. The second bearing formation of the tool may be for engaging the catch body of the leading connector to drive the trailing and leading connectors into the operative condition in which the spring mounting mechanism acts to retain the earth working tip and the tool shank in engagement with each other.

According to a fifth aspect of the invention, there is provided a kit comprising the earth working tool assembly of the first aspect and the tool of the fourth aspect.

According to a sixth aspect of the invention, there is provided an agricultural implement comprising the earth working tool assembly of the first aspect. The agricultural implement may be a plough.

BRIEF DESCRIPTION OF THE DRAWINGS

In FIG. 4, a catch body of the fastening assembly is shown in longitudinal section, a left side of the catch body removed.

DETAILED DESCRIPTION

Figure 1:
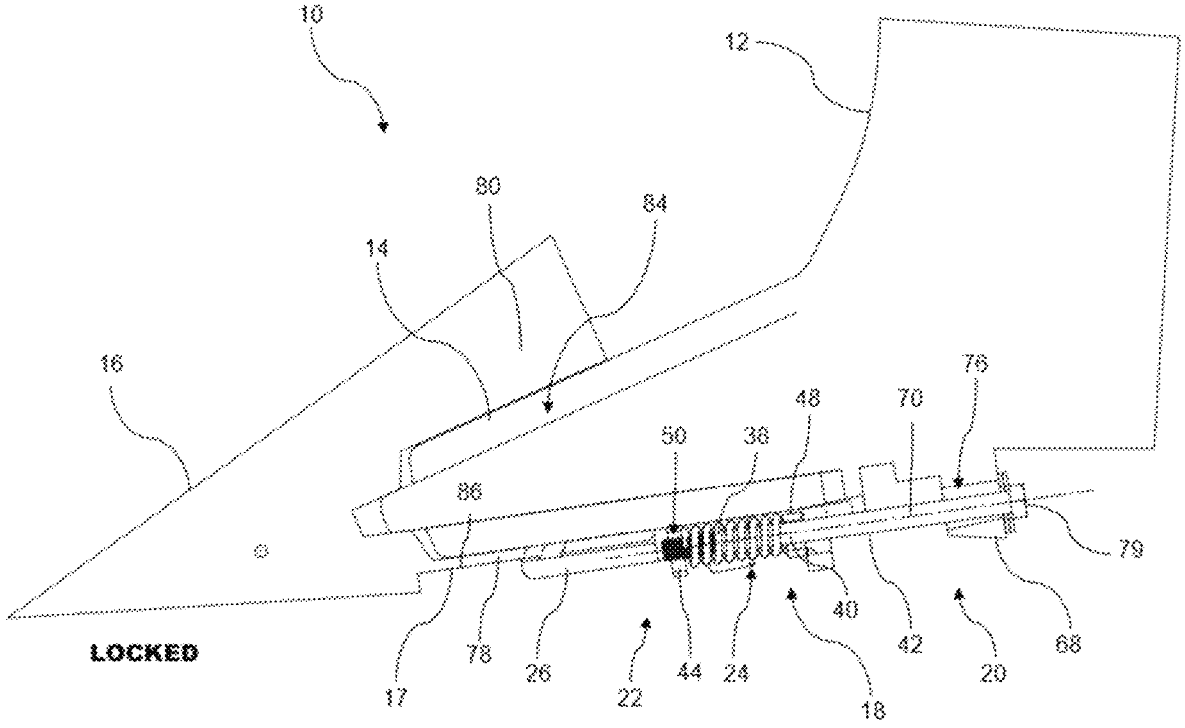
FIG. 1 shows a schematic, longitudinal sectional view of an embodiment of an earth working tool assembly, in accordance with the invention, wherein an earth working tip is secured to a tool shank.

In the drawings, reference numeral 10 indicates typical embodiments of an earth working tool assembly, in accordance with the invention.

The tool assembly 10 includes a tool shank 12 having a leading end portion 14.

The assembly 10 includes an earth working tip 16. The earth working tip 16 has a trailing end portion 17 that is detachably engageable with the leading end portion 14 of the tool shank 12.

The assembly 10 includes a fastening assembly 18 for detachably fastening the earth working tip 16 to the tool shank 12. The fastening assembly 18 includes a trailing connector 20 that is connectable to the tool shank 12. A leading connector 22 is connectable to the earth working tip 16. A spring mounting mechanism 24 is interposed between the trailing and leading connectors 20, 22 and is configured so that the trailing and leading connectors 20, 22 can be driven away from each other against a bias of the spring mounting mechanism 24, into and out of an operative condition in which the spring mounting mechanism 24 acts to retain the earth working tip 16 and the tool shank 12 in engagement with each other.

The leading connector 22 includes a catch body 26 with a leading side 28 and a trailing side 30. The catch body 26 has a floor wall 32 and two opposed side walls 34 that project from the floor wall 32 and extend between the leading and trailing sides 28, 30. A channel 36 extends between the two opposed side walls 34. The spring mounting mechanism 24 includes a spring, in the form of a coil spring 38. The spring mounting mechanism 24 includes a leading portion 40 of a rod 42 that extends between the side walls 34 and through the coil spring 38.

A leading spring retainer 44 is positioned in the catch body 26 with the leading portion 40 connected to the leading spring retainer 44 at or near a leading end 46 of the rod 42. A trailing spring retainer 48 is secured in the catch body 26 against displacement in a trailing direction, at or near the trailing side 30. The rod 42 extends through the trailing spring retainer 48, and the spring 38 is secured between the leading and trailing spring retainers 44, 48.

The leading spring retainer 44 defines a threaded opening 50. The leading portion 40 of the rod 42 is threaded so that it can be threaded into the opening 50 to secure the rod 42 to the leading spring retainer 44.

Figure 7:
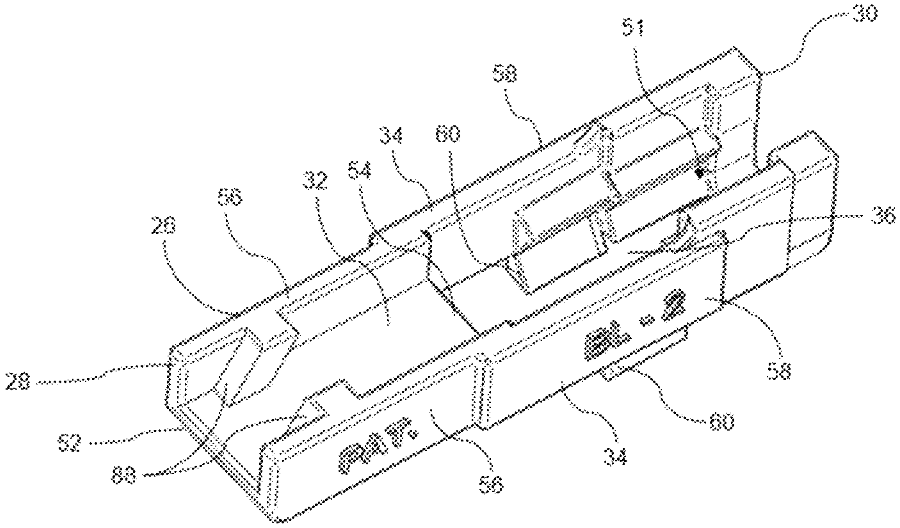
FIG. 7 shows an upper perspective view of the catch body of the fastening assembly of the earth working tool assembly of FIG. 4.

The catch body 26 is shown in detail in FIG. 7. The catch body 26 defines a trailing locating formation 51. The trailing spring retainer 48 is shaped to nest in the formation 51. The formation 51 is shaped so as to inhibit displacement of the spring retainer 48 in a trailing direction and to retain the trailing retainer 48 against lateral displacement out of the catch channel 36. The trailing retainer 48 defines an opening through which the rod 42 can extend.

The floor wall 32 has a leading edge 52 that terminates at the leading side 28 and a trailing edge 54 that terminates at a position interposed between the leading and trailing sides 28, 30. Each side wall 34 has a leading portion 56 that is coterminous with the leading edge 28 and the trailing edge 54. Each side wall 34 has a trailing portion 58. A retainer stop 60 projects operatively downwardly from each trailing portion 58.

Figure 10:
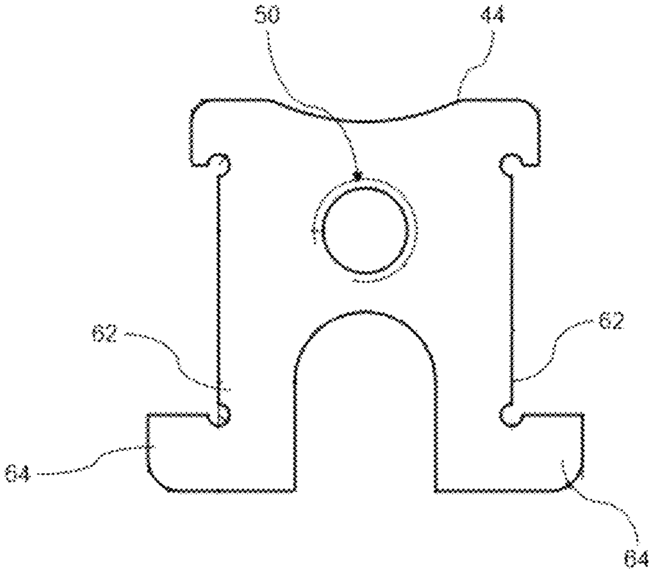
FIG. 10 shows a leading spring retainer of the fastening assembly of the earth working tool assembly of FIG. 4.

The leading spring retainer 44 is generally rectangular and flat. A profile of the leading spring retainer 44 is shown in FIG. 10. In addition to the threaded opening 50, the spring retainer 44 defines a pair of guide legs 62. The guide legs 62 are shaped to engage respective trailing portions 58 of the side wall 34 to facilitate guided, sliding movement of the leading spring retainer 44 relative to the catch body 26. To that end, each leg 62 includes a foot 64 that overlies the associated trailing portion 58, intermediate the trailing edge 54 of the floor wall 32 and the retainer stop 60.

The leading spring retainer 44 is shaped so that when the leading spring retainer 44 is received in the catch body 26 with the feet 64 overlying the trailing portions 54, the threaded opening 50 is in general alignment with the trailing edge 54 of the floor wall 32. Thus, with the rod 42 received through the trailing spring retainer 48, the spring 38 and secured to the leading spring retainer 44, a relative position of the leading spring retainer 44 and the trailing spring retainer 48 can be adjusted by rotation of the rod 42. This can serve to adjust an extent of movement of the catch body 26 since it adjusts a relative position of the leading spring retainer 44 and the stops 60.

The retainer stops 60 are positioned so that at a particular extent of displacement of the catch body 26 in a leading direction, the feet 64 bear against the retainer stops 60 to inhibit further displacement of the catch body 26 in the leading direction.

The tool shank 12 includes an anchor 68. The trailing connector 20 includes a trailing portion 70 of the rod 42 that is secured to the anchor 68 at least against longitudinal displacement relative to the tool shank 12. The anchor 68 has a leading side 72 and an opposed trailing side 74. A passage 76 extends through the anchor 68 between the leading and trailing sides 72, 74. The rod 42 extends through the passage 76. A head 79 is arranged on a trailing end of the rod 42. The head 79 is dimensioned to bear against the trailing side 74 of the anchor 68 to secure the rod 42 against linear displacement relative to the tool shank 12 in a leading direction. The passage 76 is configured to permit limited, pivotal movement of the rod 42 relative to the tool shank 12, and thus limited pivotal movement of the fastening assembly 18 relative to the tool shank 12.

The trailing end portion 17 of the earth working tip 16 includes a lower wall 78, an upper wall 80 and opposed side walls 82. The walls 78, 80, 82 define a socket 84 in which the leading end portion 14 of the tool shank 12 is received when the tip 16 is engaged with the shank 12. A rib 86 that extends in a leading direction projects from an outer side of the lower wall 78.

The catch body 26 has a catch formation in the form of opposed ridges 88 that project from the leading portions 56 of the side wall 34 into the channel 36 and extend in a trailing direction from the floor wall 32. The rib 86 defines a catch formation with opposed recesses 90 that correspond with respective ridges 88.

The catch body 26 and the rod 42 are configured so that it is necessary to displace the catch body 26 to a predetermined extent in a leading direction relative to the anchor 68 to bring the ridges 88 into alignment with the recesses 90. It will be appreciated that when the catch body 26 is urged away from the anchor 68, relative displacement of the rod 42 and the catch body 26 results in the spring 38 being compressed. Thus, when the ridges 88 are received in the recesses 90, tension set up in the spring 38 secures the tip 16 to the foot shank 12 to retain the tip 16 in a working position. The slope or inclination of the ridges 88 and the recesses 90 requires that the catch body 26 effectively hooks onto the tip 16, with a length of the ridges 88 limiting the extent of movement of the catch body 26 in the trailing direction as the spring 38 expands.

Thus, to unhook, or disengage the ridges 88 from the recesses 90, it is necessary to displace the catch body 26 in a leading direction, to said predetermined extent to facilitate release of the ridges 88 from the recesses 90. In use, the fastening assembly 18 is positioned underneath the tool shank 12. Thus, when the ridges 88 are disengaged from the recesses 90, the fastening assembly 18 can move away from the tool shank 12 under gravity with said limited pivotal movement. In that condition, the tip 16 can be removed from the tool shank 12.

To re-engage the catch formations, the catch body 26 is displaced to said predetermined extent away from the anchor 68 so that the ridges 88 are aligned with the recesses 90 so that subsequent pivotal movement in an opposite direction can secure the catch body 26 on the tip 16, so securing the tip 16 to the tool shank 12 with the resultant spring tension referred to above.

Figure 2:
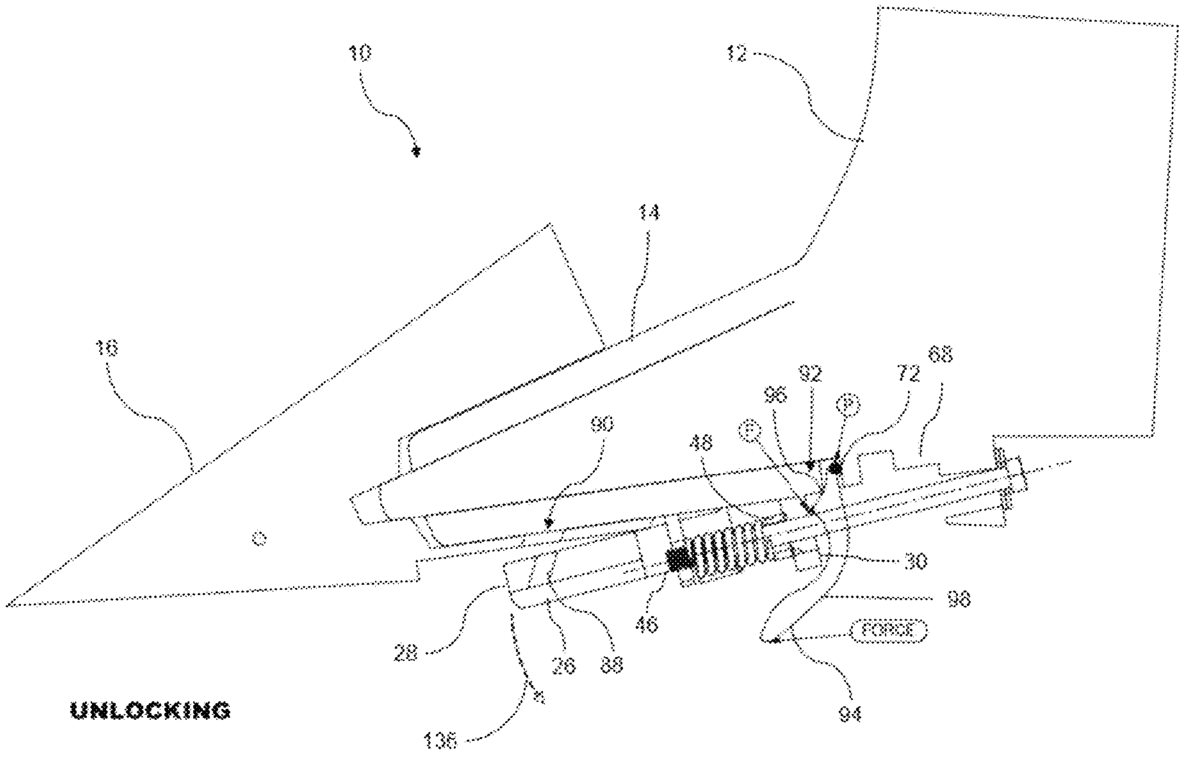
FIG. 2 shows a schematic, longitudinal sectional view of the earth working tool assembly of FIG. 1, illustrating detachment of a fastening assembly from the earth working tip.

The catch body 26 and the anchor 68 are configured so that when the ridges 88 are received in the recesses 90, as described above, a gap 92 is provided between the leading side 72 of the anchor 68 and the trailing side 30 of the catch body 26. The rod 42 spans the gap 92. In use, when the ridges 88 are received in the recesses 90, a working portion 96 of a suitable levering tool 94 (FIG. 2) can be positioned in the gap 92 to engage the trailing side 30 of the catch body 26, at a position (F) between the rod 42 and the tool shank 12, and to engage the leading side 72 of the anchor 68, at a position (P). The levering tool 94 has an elongate handle 98. The positions (F) and (P) have a relative orientation such that urging of the handle 98 in the leading direction results in the working portion 96 pivoting to provide linear displacement of the catch body 26 away from the anchor 68 to said predetermined extent so that the ridges 88 can be released from the recesses 90, with the fastening assembly 18 pivoting away from the foot shank 12, as described above, in the direction of an arrow 136.

Figure 3:
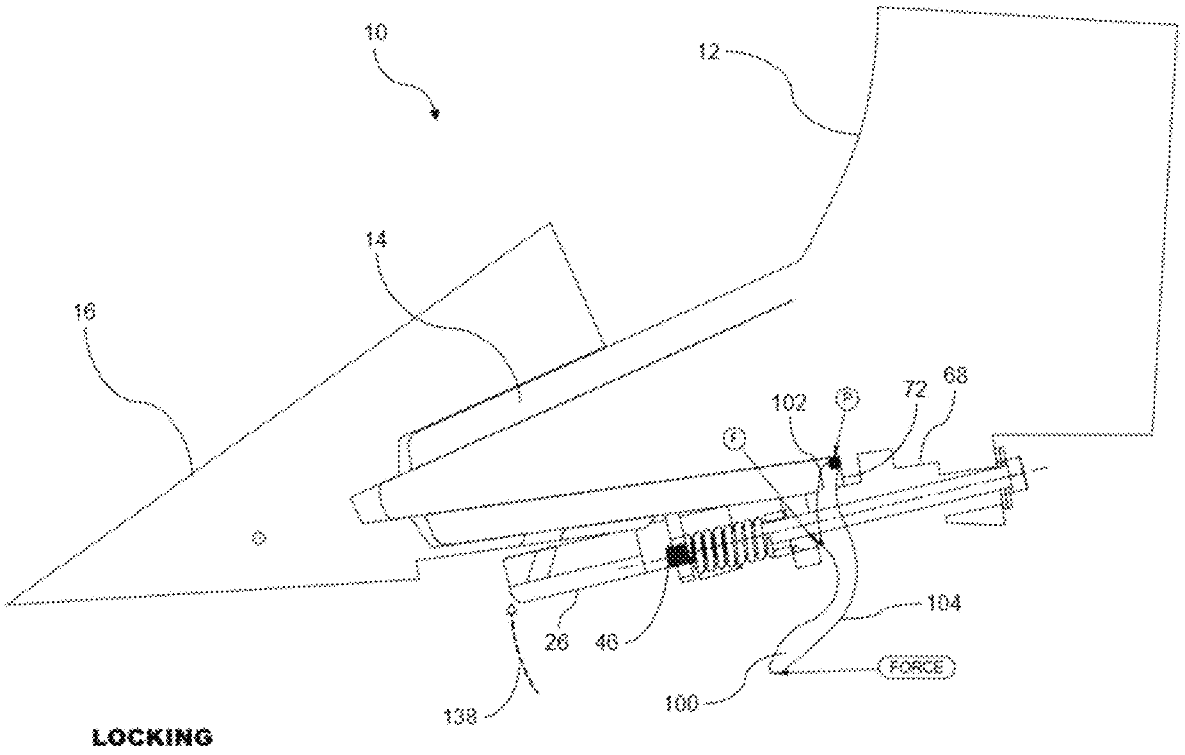
FIG. 3 shows a schematic, longitudinal sectional view of the earth working tool assembly of FIG. 1, illustrating attachment of the fastening assembly to the earth working tip.

Subsequently, a working portion 102 of a suitable levering tool 100 (FIG. 3) can be positioned in a resulting space between the catch body 26 and the anchor 68. The working portion 102 can be positioned to engage the trailing side of the catch body 26 at a position (F) below the rod 42, and to engage the leading side 72 of the anchor 68, at a position (P). The levering tool 100 has an elongate handle 104. The positions (F) and (P) have a relative orientation such that urging of the handle 104 in the leading direction results in the working portion 102 pivoting to provide linear displacement of the catch body 26 away from the anchor 68 to said predetermined extent, and to pivot the fastening assembly 18 back towards the tool shank 12, in the direction of an arrow 138, so that the recesses 90 and ridges 88 can be brought into register with each other, with a subsequent release of the tool 100 resulting in the catch body 26 being driven into engagement with the tip 16 to secure the tip 16 to the tool shank 12.

Figure 4:
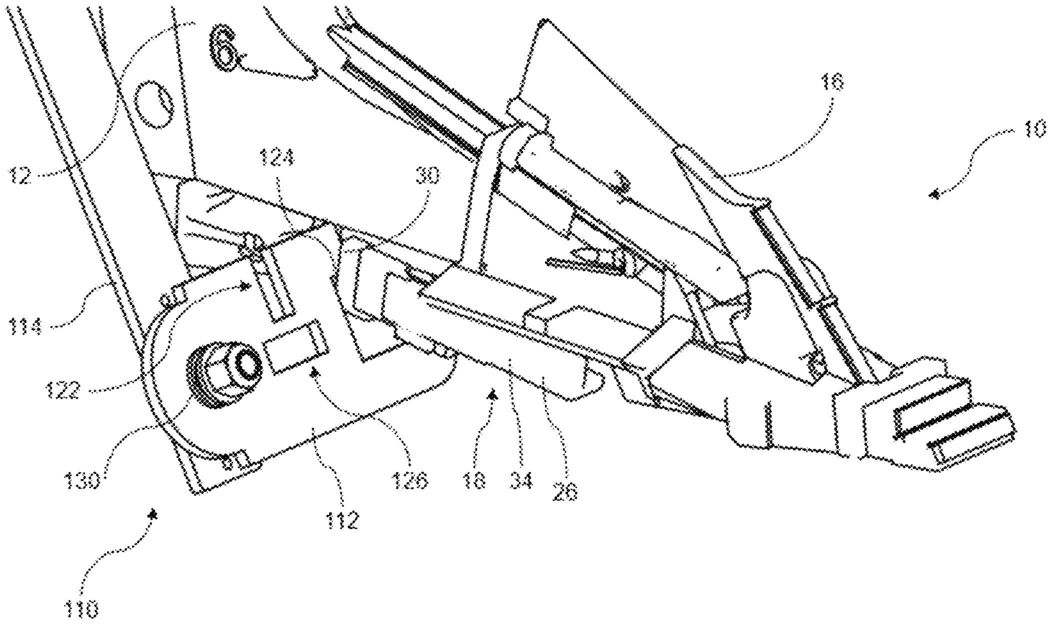
FIG. 4 shows a right-side perspective view of an embodiment of an earth working tool assembly, in accordance with the invention, illustrating use of a tool for attachment and detachment of a fastening assembly from an earth working tip.

In FIG. 4, reference numeral 110 indicates an embodiment of a levering tool that can be used to engage or disengage the catch body 26 and the tip 16, as described above. The levering tool 110 has a working portion 112 and an elongate handle 114 connected to the working portion 112. The working portion 112 and the elongate handle 114 are in the form of steel plates with a thickness to permit the working portion 112 to be received in the gap 92, as described above. The working portion 112 is profiled so that it can carry out both a releasing function and a securing function, as carried out by the tools 94, 100, as described above. The elongate handle 114 is of a suitable length to provide a lever advantage to a user.

Figure 8:
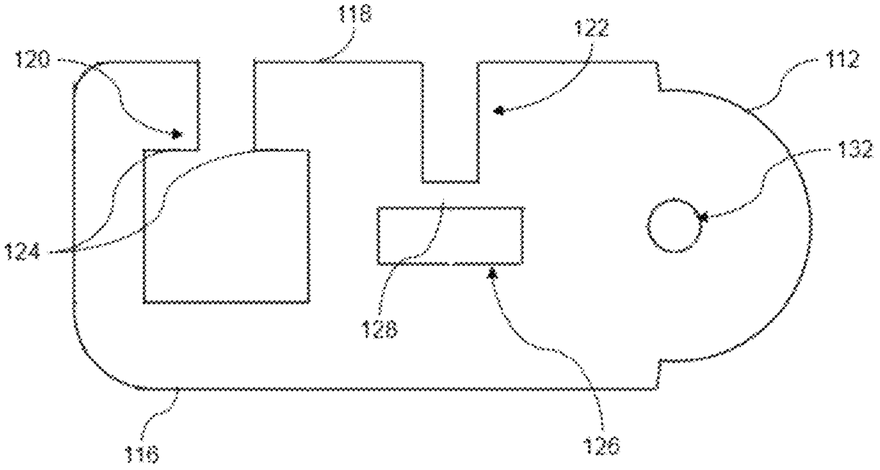
FIG. 8 shows a front view of a working portion of the tool for attachment and detachment of the fastening assembly of to the earth working tool assembly of FIG. 4.
Figure 9:
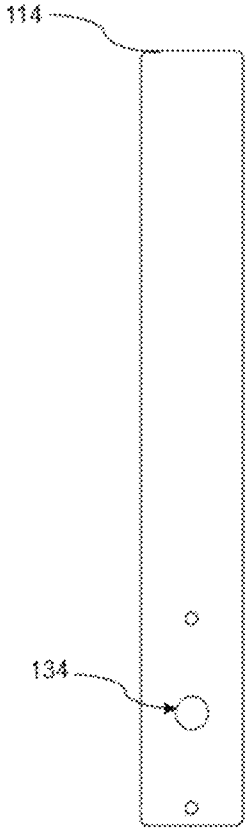
FIG. 9 shows a handle of the tool of FIG. 8.

In FIG. 8, there is shown a profile of the working portion 112. The working portion 112 defines a distal edge 116 and an opposed proximal edge 118. The working portion 112 defines first and second recesses 120, 122 that are dimensioned to accommodate the rod 42 and open at the proximal edge 118. The first recess 120 defines a first bearing formation in the form of opposed shoulders 124. A rectangular aperture 126 is in general alignment with the second recess 122 so that a second bearing formation in the form of a section 128 is interposed between the second recess 122 and the aperture 124. The opposed shoulders 124 are closer to the proximal edge 118 than the section 128.

Figure 5:
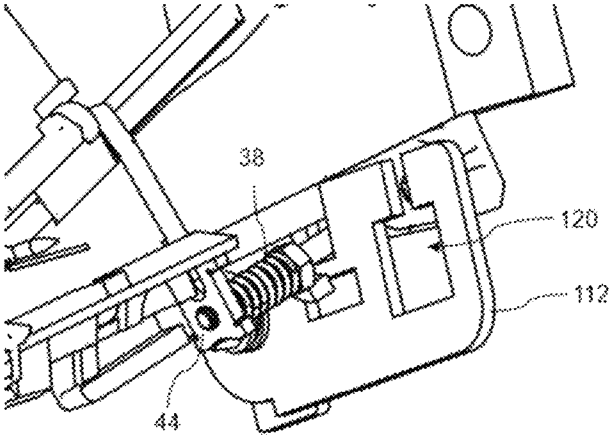
FIG. 5 shows a partial, left-side perspective view of the earth working tool assembly of FIG. 4, illustrating use of the tool for attachment and detachment of the fastening assembly to the earth working tip. As in FIG. 4, in FIG. 5, the catch body of the fastening assembly is shown in longitudinal section, the left side of the catch body removed.
Figure 6:
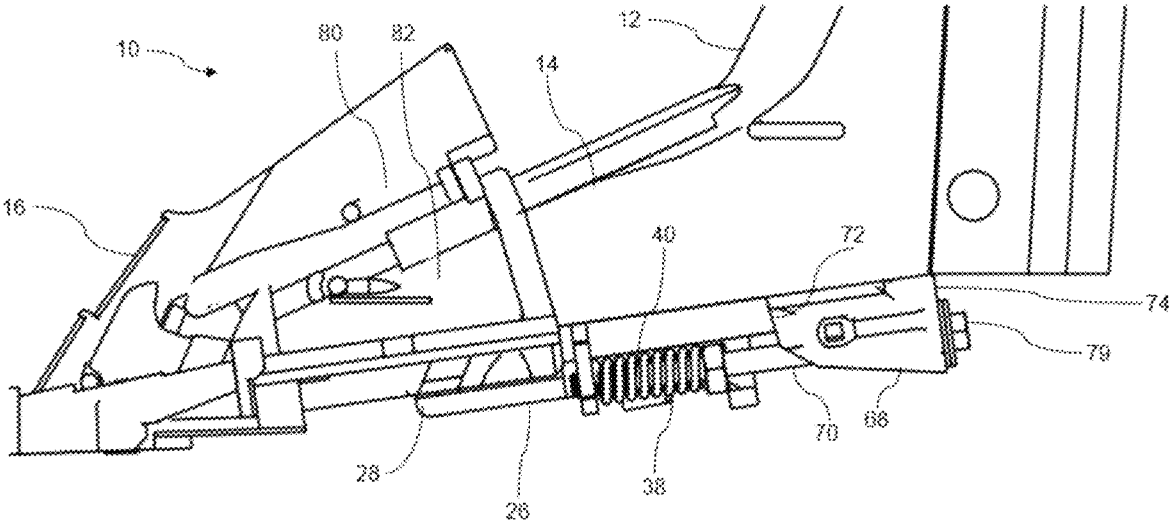
FIG. 6 shows a side view of the earth working tool assembly of FIG. 4 in an operative condition. As in FIG. 4, in FIG. 6, the catch body of the fastening assembly is shown in longitudinal section, the left side of the catch body removed.

Thus, when the rod 42 is received through the first recess 120, the shoulders 124 can engage the catch body 26 (FIG. 4) at a position interposed between the rod 42 and the tool shank 12. When the rod 42 is received through the second recess 120, the section 128 can engage the catch body 26 (FIG. 5) at a position on an opposite side of the rod 42. Thus, to disengage the ridges 88 and recesses 90, as described above, the working portion 112 can be manipulated so that the rod 42 is received through the first recess 120. In that position, the working portion 112 can be tilted so that the proximal edge 118 bears against the anchor 68 while the shoulders bear against the catch body 26 at said position interposed between the rod 42 and the tool shank 12. To engage the ridges 88 and recesses 90, as described above, the working portion 112 can be manipulated so that the rod 42 is received through the second recess 122. In that position, the working portion 112 can be tilted so that the proximal edge 118 bears against the anchor 68 while the section 128 bears against the catch body 26 on an opposite side of the rod 42.

The handle 114 is bolted to the working portion 112 with a suitable nut and bolt combination 130, a shank of which is received through an opening 132 defined by the working portion 112 and an opening 134 defined by the handle 114.

It will be appreciated that the catch body 26 can be attached or detached to the tip 16 without the need for unscrewing fasteners. Rather, the levering tool can be manipulated into a required position and rotated to either secure or detached the catch body 26, and thus the tip 16, to the tool shank 12. Furthermore, the handle 114 can be secured to the working portion 112 to extend proximally from the working portion 112 (FIG. 4, 5) to facilitate attachment or detachment without the need for accessing the catch body 26 from underneath the tool shank 12. This can result in the detachment or attachment of the catch body 26 quickly and efficiently, particularly on site where soil and other detritus may cling to the earth working tool assembly 10.

It follows that the earth working tool assembly 10 has the benefits and advantages of AU160, set out therein, together with the added benefit and advantage of quick and efficient attachment and detachment of the tip 16.

The appended claims are to be considered as incorporated into the above description.

Throughout this specification, reference to any advantages, promises, objects or the like should not be regarded as cumulative, composite, and/or collective and should be regarded as preferable or desirable rather than stated as a warranty.

Throughout this specification, the word “proximal” together with derivatives thereof are used to indicate an orientation or side that is close to or near an operator or user. The word “distal” together with derivatives thereof has an opposite meaning.

Throughout this specification, the word “leading” is used to indicate an orientation towards a direction of travel of the earth working tool assembly, in use. The word “trailing” is used to indicate an opposite meaning.

Throughout this specification, the terms “comprises”, “comprising”, “includes”, “including”, and similar terms, are intended to denote the inclusion of a stated integer or integers, but not necessarily the exclusion of another integer or other integers, depending on context. That is, a product, composition, or method, etc., that comprises or includes stated integer(s) need not have those integer(s) solely, and may well have at least some other integers not stated, depending on context.

When any number or range is described herein, unless clearly stated otherwise, that number or range is approximate. Recitation of ranges of values herein are intended to serve as a shorthand method of referring individually to each separate value falling within the range, unless otherwise indicated herein, and each separate value and each separate subrange defined by such separate values is incorporated into the specification as if it were individually recited herein.

In this specification, terms such as “above” and “below”; “front” and “back”; “top” and “bottom”; “left” and “right”;

"horizontal" and "vertical", and the like, may be used for descriptive purposes. However, it will be understood that embodiments can potentially be arranged in various orientations, and that such relative terms are not limiting and may be interchangeable in appropriate circumstances.

The term "and/or", e.g., "A and/or B" shall be understood to mean either "A and B" or "A or B" and shall be taken to provide explicit support for both meanings or for either meaning. Features which are described in the context of separate aspects and embodiments of the invention may be used together and/or be interchangeable. Similarly, features described in the context of a single embodiment may also be provided separately or in any suitable sub-combination.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

The invention claimed is:

1. An earth working tool assembly comprising:

a tool shank having a leading end portion;

an earth working tip having a trailing end portion that is detachably engageable with the leading end portion of the tool shank; and a fastening assembly for detachably fastening the earth working tip to the tool shank, the fastening assembly comprising:

a trailing connector that is connectable to the tool shank;

a leading connector comprising a catch body with a leading side and a trailing side that is connectable to the earth working tip, at least one catch formation arranged on the catch body and releasably engageable with at least one complementary catch formation on the earth working tip; and a spring mounting mechanism interposed between the trailing and leading connectors, the spring mounting mechanism being configured so that the trailing and leading connectors can be driven away from each other against a bias of the spring mounting mechanism, into and out of an operative condition in which the spring mounting mechanism acts to retain the earth working tip and the tool shank in engagement with each other, wherein the catch formations are configured so that displacement of the leading connector in a leading direction against the bias of the spring mounting mechanism serves to disengage the catch formations, and displacement of the leading connector, under action of the spring mounting mechanism, in a trailing direction, serves to engage the catch formations.

2. The earth working tool assembly as claimed in claim 1, wherein the catch formations are configured so that the catch formation on the catch body is required to extend in a leading direction to a predetermined extent before the catch formation can be engaged with, or disengaged from, the complementary catch formation.

3. The earth working tool assembly as claimed in claim 2, wherein the catch formations are configured so that, at the predetermined extent, the catch body can be maneuvered to bring the catch formations into register with each other, with subsequent release of the catch body resulting in the catch formations being engaged with each other to limit movement of the catch body in the trailing direction, such that the bias of the spring mounting mechanism serves to retain the earth working tip in a working condition, and, in a reverse operation to detach the catch formations from each other, the catch body can be driven in a leading direction, against the bias of the spring mounting mechanism, relative to the tool shank such that, at said predetermined extent of movement, the catch body can be maneuvered to bring the catch formations out of engagement with each other to release the catch body, allowing the earth working tip to be disengaged from the tool shank.

4. The earth working tool assembly as claimed in claim 1, wherein the trailing connector is connected to the tool shank to facilitate limited pivotal movement of the trailing connector and thus the fastening assembly with respect to the tool shank.

5. The earth working tool assembly as claimed in claim 1, wherein the catch body has a floor wall and two opposed side walls that project from the floor wall and extend between the leading and trailing sides.

6. The earth working tool assembly as claimed in claim 5, wherein the spring mounting mechanism includes a spring positioned in the catch body.

7. The earth working tool assembly as claimed in claim 6, wherein the spring mounting mechanism includes a leading portion of a rod that extends into the catch body and through the spring.

8. The earth working tool assembly as claimed in claim 7, wherein a leading spring retainer is positioned in the catch body with the leading portion of the rod connected to the leading spring retainer at or near a leading end of the rod.

9. The earth working tool assembly as claimed in claim 8, wherein the spring mounting mechanism includes a trailing spring retainer that is secured in the channel against displacement in at least a trailing direction, at or near the trailing side of the catch body, with the rod extending through the trailing spring retainer and the spring secured between the leading and trailing spring retainers, the rod being longitudinally displaceable relative to the trailing spring retainer.

10. The earth working tool assembly as claimed in claim 9, wherein the tool shank includes an anchor, and the trailing connector includes a trailing portion of the rod that is secured to the anchor at least against longitudinal displacement relative to the tool shank.

11. The earth working tool assembly as claimed in claim 10, wherein the anchor has a leading side and an opposed trailing side, a passage extending through the anchor between the leading and trailing sides, and the rod extending through the passage.

12. The earth working tool assembly as claimed in claim 11, wherein a head is arranged on a trailing end of the rod, the head being dimensioned to bear against the trailing side of the anchor to secure the rod against linear displacement relative to the tool shank in a leading direction.

13. The earth working tool assembly as claimed in claim 11, wherein the catch body and the anchor are configured so that when the catch formations are engaged with each other, a gap is provided between the leading side of the anchor and the trailing side of the catch body, with the rod spanning the gap, so that, in use, when the catch formations are engaged with each other, a suitable tool can be positioned in the gap to engage the trailing side of the catch body at a position between the rod and the tool shank and then manipulated to drive the catch body, against a bias of the spring, away from the anchor to disengage the catch formations, and to allow the tip to be removed from the tool shank, and subsequently, a suitable tool can be positioned in a resulting space between the catch body and the anchor to engage the leading side of the anchor at a position between the rod and the tool shank and to engage the trailing side of the catch body on an opposite side of the rod so that the tool can then be manipulated to drive the catch body, against a bias of the spring, away from the anchor to urge the catch formations apart and pivot the fastening assembly towards the tool shank, so that, on release of the tool, the spring can serve to drive the catch formations into engagement with each other, so to secure the tip to the tool shank.

14. The earth working tool assembly as claimed in claim 13, wherein the trailing end portion of the earth working tip includes a lower wall and opposed side walls, the walls defining a socket in which the leading end portion of the tool shank is received when the tip is engaged with the shank, a rib extending in a leading direction and projecting from an outer side of the lower wall.

15. A tool for driving the trailing connector and the leading connector of the fastening assembly of the earth working tool assembly as claimed in claim 1 against the bias of the spring mounting mechanism of the fastening assembly, the tool comprising first and second bearing formations for engaging the leading connector of the fastening assembly, wherein the first bearing formation is for engaging the leading connector to drive the trailing and leading connectors out of the operative condition in which the spring mounting mechanism acts to retain the earth working tip and the tool shank in engagement with each other; and the second bearing formation is for engaging the catch body of the leading connector to drive the trailing and leading connectors into the operative condition in which the spring mounting mechanism acts to retain the earth working tip and the tool shank in engagement with each other.

16. A method of detachably fastening an earth working tip to a tool shank with a fastening assembly, the method including steps of:

connecting a trailing connector of a fastening assembly with a tool shank;

connecting a leading connector of the fastening assembly comprising a catch body with a leading side and a trailing side with an earth working tip, wherein at least one catch formation arranged on the catch body is releasably engaged with at least one complementary catch formation on the earth working tip; and retaining the trailing connector and the leading connector in an operative condition using a spring mounting mechanism of the fastening assembly interposed between the trailing connector and the leading connector, wherein the spring mounting mechanism retains the earth working tip and the tool shank in engagement with each other, wherein displacement of the leading connector of the fastening assembly, under action of the spring mounting mechanism, in a trailing direction, engages the catch formations of the catch body and the earth working tip, and displacement of the leading connector in a leading direction against the bias of the spring mounting mechanism can disengage the catch formations.

* * * * *